United States Patent [19]

Warhol et al.

[11] 4,029,532
[45] June 14, 1977

[54] METHOD OF PRESHAPING AND INSTALLING CAR PLASTIC TOP

[76] Inventors: John G. Warhol, 14041 Vernon Ave., Oak Park, Mich. 48237; Milton P. Ritter, 26400 Telegraph Road, Southfield, Mich. 48034

[22] Filed: July 19, 1976

[21] Appl. No.: 706,754

[52] U.S. Cl. .............................. 156/71; 156/245; 264/220; 296/31 P; 296/137 R
[51] Int. Cl.² ................................. E04F 13/02
[58] Field of Search ............ 156/71, 245; 264/219, 264/220; 296/137 R, 31 P, 31 R

[56] References Cited
UNITED STATES PATENTS 3,141,053  7/1964  Terny .......................... 264/220
3,878,010  4/1975  Zammit ......................... 156/71

Primary Examiner—Edward G. Whitby

[57] ABSTRACT

The invention contemplates the preshaping of a flexible precut piece of vinyl or other flexible plastic, and further processing such piece to form a stiffened preshaped assembly. The stiffened preshaped assembly is formed by placing the vinyl or other plastic material about a male mold or die. The plastic material thus placed about the die is stiffened by placing thereon a gauze like material which is impregnated with a stiffening material, usually plaster of Paris. The thus formed preshape is subsequently cemented to a car body top with a subsequent removal of the stiffened shroud surrounding the vinyl top.

3 Claims, 4 Drawing Figures

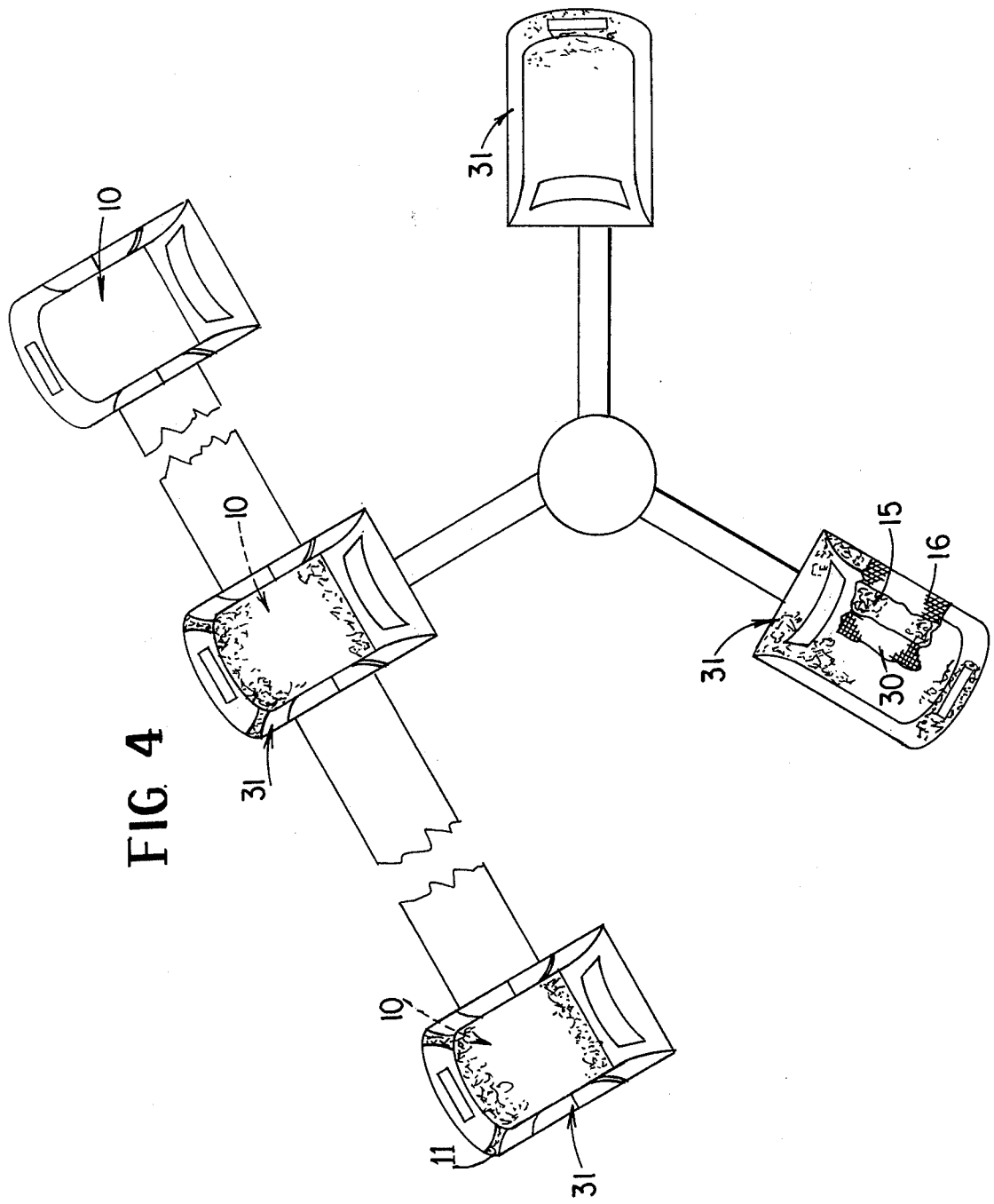

METHOD OF PRESHAPING AND INSTALLING CAR PLASTIC TOP

BACKGROUND OF THE INVENTION

This invention relates to a method preshaping and installing plastic tops for automotive vehicles. Passenger cars having plastic roof-top surfaces have become popular because of the potential for decorative effects, ease in keeping the surface clean and the long life of such surfaces.

For the most part, cars and other vehicles have sheet steel roofs, a substantial number of which are partly or completely covered with a layer of suitable plastic, as vinyl. The manner in which such plastic material is applied involves applying cement or adhesive to the surfaces of the metal roof top of a car and the inner surface of the plastic roof top material. A crew applies the precemented roof top plastic blank to the precemented car roof and adjusts the position thereof, conforming the shape of the plastic material to the car body by main force before the cement has set. Due to the fact that the roof top and some of the side portions of the car do not lie in a flat plane and due to the precut nature of the blank, it is necessary that the plastic blank be accurately positioned during the initial application of the roof top material to the car roof. It is necessary that wrinkles in the roof top material be avoided and that the shaped edges be accurately located in regions where decorative moulding is to be applied. During such an operation, considerable force is necessary in adjusting the roof top material because the cement prevents free movement between the roof top material and the metal of the car body. In addition, it is important that the outer surface finish of the plastic coating material be free from unsightly cracks, stains and wrinkles.

The application of the roof top material to the roof of a car generally occurs on a car assembly line where an automobile is assembled to end up in a completely finished car ready to be driven away. The inherent nature of this mode of applying a plastic top material to the roof of an automobile necessarily requires a fully manned crew of personnel and if the assembly line moves at the rate generally prevailing, would more frequently require a number of successive crews along the assembly line for handling the work where a large number of vinyl topped cars are involved. Apart from this, many vinyl tops will require some minor treatment to clean up the wear and tear of the vinyl surface during the trip of the car along the assembly line to the final inspection.

THE INVENTION GENERALLY

The invention contemplates a two-step process or method for handling a precut plastic blank for installation of such blank in its final position as the covering for the roof of a vehicle whose surface is to be covered by such plastic material. While the invention may be applied to any vehicle and may involve flexible plastic materials generally, it will be disclosed and illustrated in connection with an automobile vehicle passenger car, preferably having a steel roof top whose outer surface is to be covered with a flexible sheet of vinyl material.

It is understood that the invention may be applied to any vehicle and may involve any suitable plastic material other than vinyl used as a final roof top surface. In its broader aspects, the invention contemplates the preshaping of a flexible blank of roofing plastic material to conform to the contours and shapes of a die having the car roof and certain parts of the car sides depending upon the specific nature of the finished roof. The first step in a general way contemplates shaping and stretching a suitable blank of flexible plastic roofing material for a car to fit a roof and portions of the sides of an automobile and temporarily applying a matrix or shroud of suitable material, said matrix having the property of supporting the preshaped roof top material conforming precisely to the roof of the car to which the roofing material is to be finally applied. The matrix or shroud covers and adheres to the outer surface of the preshaped plastic material to provide a generally stiff roofing assembly, which will be cemented to the car top. The cementing or adhesive function is between the inner surface of the flexible roofing material and the outer surface of the car top. Thereafter, removal from the outer surface of the plastic roofing material of the matrix is effected. The matrix may be destroyed in the removal process or may be removed intact and salvaged for future use, such removal to be affected at any time after the finished car is ready for delivery to a customer. The car roof die can be a master car roof (this may be a conventional roof stamping which is normally welded to the remainder of a car body) and may have the flexible sheet of vinyl loosely applied to such car roof die and stretched and shaped by suitable manual or power means, after which suitable matrix forming material may be applied in liquid or highly flexible form to such preshaped vinyl. Thereafter, the matrix material will be treated or permitted to stiffen into a matrix embracing the outer surface of the plastic vinyl blank, the inner surface of the vinyl blank being clean and free of matrix material. After the matrix material has stiffened over the shaped and preformed vinyl, the assembly of matrix and vinyl can be thereafter applied to a roof part of a car body and cemented thereto, the opposing surfaces of car body and plastic previously having suitable cement applied thereto. The setting of the cement insures a permanent junction of plastic to the roof of the previously assembled car.

In a simple and exemplary procedure for making a matrix, it is possible to first apply a water soluble protective coating of material, such as a water soluble wax for example, to prevent damage to the outer finished vinyl surface. Thereafter, gauze of loosely woven material, similar to medical gauze, is applied, after which a paste of plaster of Paris is applied in a manner similar to the making of a cast for a human leg or arm. The outer vinyl protected surface is covered with such matrix generating material and after the matrix material has set and dried, the assembly of matrix and vinyl having a preformed contoured shape is applied to the outer surface of the car roof, after both of these surfaces have been wet with suitable cement, such as rubber cement for example. After the shrouded vinyl has been cemented to the car roof, the matrix or shroud may be removed from the vinyl. An advantage inherent in the invention lies in the fact that it is not necessary to remove the matrix from the vinyl at any particular time. It may be left on the vinyl for a sufficiently long time to insure proper setting of the cement between the vinyl and car metal roof. The matrix or shroud may be left on until sale of the car. In the case of a plaster of Paris matrix, the entire matrix may be removed as a unit or broken into pieces by the application of water or other suitable means. A matrix may be provided of material other than plaster of Paris.

In situations where an occasional plastic cover for a car is to be applied, such as for example in a repair shop, it is possible to apply a precut plastic blank to a desired shape to the roof top of a car, the roof top having been previously stripped of its plastic cover, and such plastic material blank being suitably shaped and pulled as would be the case in a factory installation. Thereafter, a stiffening shroud may be applied to the plastic preshaped blank, it being understood that a protective layer of a suitable material has been previously applied to the plastic blank to protect the same against damage from matrix processing and a stiffening shroud material prepared over such preshaped plastic blank. In such an occasional roof covering installation, the plastic material with its matrix is then prepared for cementing over the car roof that is being refinished, the stripped car roof material usually of metal and the inside surface of the shrouded plastic material being respectively wet with cement or adhesive, after which the matrix and plastic top are pressed down over the car roof for a permanent installation. As is true in the case of a factory installation, such an occasional installation will require the removal of the matrix from the installed plastic roof top and the cleaning up of the exposed roof top plastic material.

The new method of applying a plastic cover to a car rigid roof top may be readily applied both to factory installations on an assembly line basis as well as to individual operation on a car by a repair shop where a plastic cover for the roof must be replaced.

DESCRIPTION OF THE DRAWINGS

The invention will now be disclosed in connection with the drawings wherein:

FIG. 4 is a diagrammatic view of a suggested layout of cover handling equipment for applying a preshaped matrix and plastic roof material assembly to a vehicle top along an assembly line.

DESCRIPTION OF THE PREFERRED MODE OF PRACTICING THE INVENTION

Figure 1:
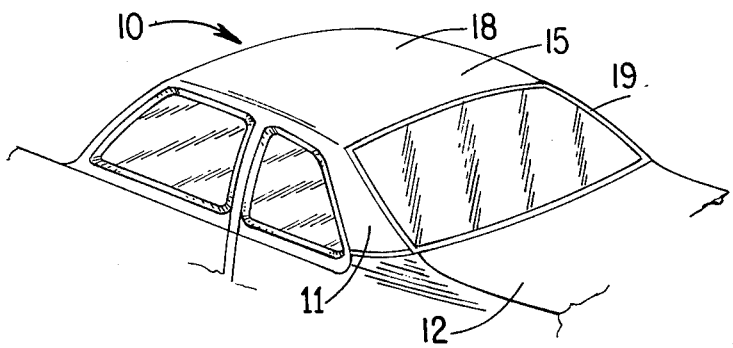
FIG. 1 is a perspective view of the top car portion having applied thereto the vinyl roof, the finished roof top portion of the car having downwardly extending strip portions from the roof toward the main body of the car also covered with vinyl.
Figure 2:
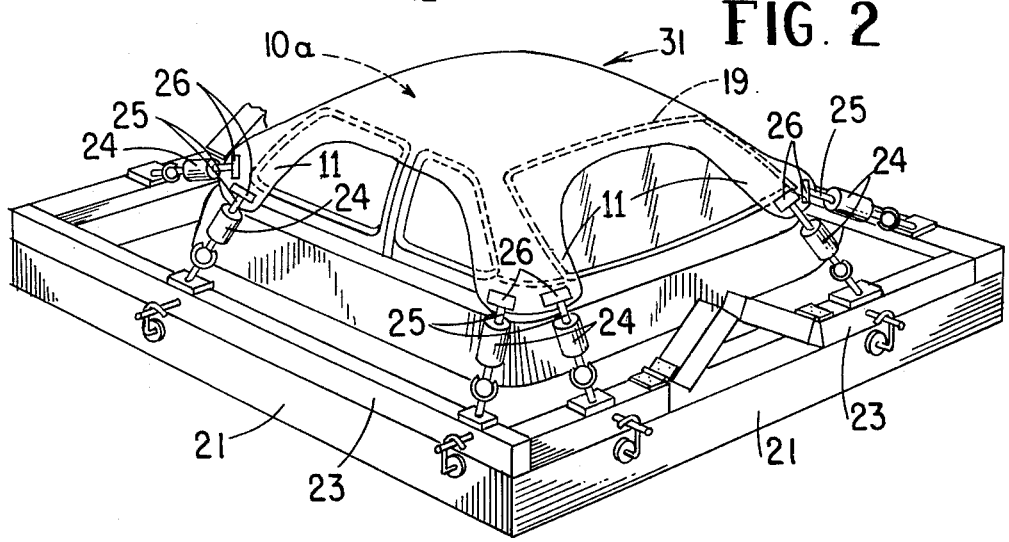
FIG. 2 is a perspective view of a plastic car roofing top assembly facility including a die portion of a car top body part to which vinyl may be applied and a base portion including power means for pulling and shaping a plastic top.

The new process is most conveniently applied to automotive passenger vehicles, such as for example a conventional passenger automobile having metal roof top portion 10 and downwardly extending metal support portions 11 extending between the roof top and the principal car body portion 12. As a rule, rear and side windows are provided and a front windshield is provided for insuring visibility in all directions. Automobiles having so-called plastic tops, either entire or partial, generally have vinyl plastic layer 15 having the outer surface thereof normally exposed to atmosphere and having the inner surface thereof cemented to a layer 16 of felt or other similar material. Felt layer 16 makes it possible to tightly join the plastic to the metal car body roof top by means of conventional cement or adhesive, such as rubber cement as an example. Generally, roof top 18 is not planar but has some curvature laterally and longitudinally of the car body and includes peripheral portions which extend downwardly of the car to frame the various windows present in a car body. Generally, moulding strips 19 of metal or plastic cover the edges of plastic roofing material and window glass or window plastic material to provide finished decorative effects, as well as prevent raw edges of metal or roofing material from working loose. This is all conventional and has been present in automobiles and other vehicles for many years.

As has been previously indicated in general terms, it has been and still is the practice in the industry to wet the outer surface of the car metal roof top and sides with cement and also the inside felt surface of cover material and position the precemented roof top material to the car roof top and by main force stretch and work the plastic material to shape in correct position. The precut plastic material generally has marginal gripping portions which normally would extend beyond the required boundaries of the installed material on the roof car top, which excess portions may be trimmed off after a vinyl top has been installed finally on a car body.

Generally, a crew of workers on an assembly line, each person being equipped with an appropriate gripping tool for engaging the free edge of the plastic material, can apply force to tension, stretch and shape the plastic material in position. Such gripping tools generally include opposing jaw portions have opposed sharp alligator-type teeth for biting into the edge of the plastic to obtain a firm grip thereon. Only the marginal portions of the plastic material are gripped during the process of applying the roofing material, such marginal portions being surplus or hidden by decorative cover moulding. The extensive areas of the opposed plastic and roof surfaces, when coating with adhesive or cement, create considerable friction against relative movement of the plastic and car metal material and thus require muscular personnel for the shaping and positioning of the roof material on the car body top.

An automobile assembly line will have preprogrammed automobile parts so that successive automobiles along the assembly line will meet the program requirements as to size of chassis, type of body such as 2-door or 4-door, body colors and the like, successive cars frequently varying in physical extent of the car roof as well as other parts of a car body.

In accordance with the invention, the assembly process normally carried out along a long assembly conveyor can be improved by having a feeder line away from the main assembly line and providing a die functioning car top portion 10a which may be exactly the same as a conventional car top portion 10 of an entire car having the desired number of doors and windows and anchoring or resting such portion 10a upon base 21 having a rigid, generally rectangular, frame. Frame 21 may be small enough so that a working crew may manually pull and stretch a vinyl precut blank, consisting of vinyl 15 and felt layer 16, over the die roof top 10a. It is understood that the felt inner surface of the vinyl top material is free from cement and that the metal or rigid top material of die car top 10a is also free of cement or anything else which might impair the preshaping of the precut vinyl blank.

While the vinyl blank positioned over the car top die 10a may be manually stretched and shaped, it is possible to provide power means for accomplishing this. Thus, frame 21 may have anchored thereto adaptor rails 23 carrying air cylinders 24, each having piston 25 carrying claw arms 26 provided with serrated jaws for gripping edge portions of a vinyl blank. The air cylinders are disposed at strategic points for pulling upon the vinyl blank and are adapted to provide suitable forces upon the pistons and vinyl gripping jaws for stretching purposes. The air cylinders may either be of the pressure or vacuum type and will have normal relief valve means for preventing the application of excessive forces upon the vinyl material. Additional cylinder operated gripping means for edge portions of the vinyl material at various regions of the side, rear windows and windshied may be provided to insure proper stretching and shaping of the vinyl roofing material.

After the vinyl top material has been properly positioned and stretched to shape, the vinyl top material is retained in such shaped condition for further processing. If manual stretching and shaping of the material is utilized, then suitable means for anchoring the jaws for gripping the edges of the vinyl material should be provided either in the form of springs anchored to frame 21 or weights so that further processing of the vinyl top may occur.

Figure 3:
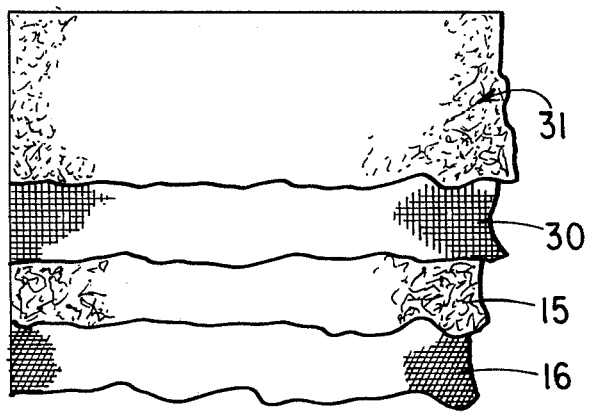
FIG. 3 is a detail of the plastic top material and matrix or shroud forming layer.

The vinyl top material on die 10a should now be covered by a layer of protective material, such as wax or other coating, so that the matrix generating material to be applied over the vinyl does not damage the vinyl outer surface. As an example, wax such as used for polishing a car body or for dressing vinyl may be applied to the vinyl. Thereafter a matrix generating material is applied. As shown in FIG. 3, one example of such matrix forming material consists of gauze or mesh 30 of textile material — either natural or synthetic fibers — may have a watery paste of plaster of Paris applied thereto. Such plaster of Paris paste when spread over the vinyl outer surface and permitted to dry will provide a stiff matrix or shroud 31. It is understood that this matrix material and final matrix will cover all of the vinyl material not only on top of the car but extending downwardly along the various strips extending from the roof of the car down to the car body proper. After the plaster has dried (by heat as a rule) and has formed a stiff matrix for the vinyl material resting over die car top 10a, the means for retaining the preshaped vinyl top may be released to permit removal from die top 10a of the matrix assembly, consisting of the matrix proper 31 and the preshaped vinyl car roof top material. Adhesive, cement or the like may be applied to the felt under the vinyl inner surface and car roof top. The matrix and vinyl assembly may thereupon be moved to a supply conveyor or turntable, as illustrated in FIG. 4 for example, and go through a warming or heating station, after which a particular matrix and vinyl assembly unit may be supplied to the proper car on the main assembly line for disposition on the appropriate car top body. Due to the fact that the matrix 31 provides full protection to the outer surface of the vinyl roof material, it is even possible to apply a vinyl roof to a car body top prior to welding the car body top to the main car body. As a rule, however, it may be desirable to substantially finish a car assembly on the main assembly line and apply liquid cement or adhesive to the inner felt surface of the vinyl part of the matrix vinyl assembly and the outer surface of the rigid metal car roof top and apply the assembly to the car roof top thereafter on the assembly line so that insofar as the car roof top is concerned, the car is completely finished, only requiring the removal of the matrix from the vinyl and possibly cleaning up the vinyl surface which has been cemented to the car body top. Thus minimum changes to assembly lines will be necessary.

While the matrix 31 may be removed from the vinyl top material at the factory, it is possible to retain the matrix as a protection to the vinyl top until the car has reached a dealer or even until a car has been sold to a customer. Suitable suction means may be applied over the exposed area of the matrix for pulling the matrix away from the cemented car top. It is possible to provide a wax or coating for the vinyl material prior to the application of the matrix generating material to prevent too tight adhesion of the matrix to the outer surface of the vinyl. Inasmuch as the vinyl material is quite light, no great adhesive force is required between the matrix and vinyl. Consequently, a rather low suction force may be applied to the matrix area for separating the matrix from the vinyl. Thereafter, the free outer surface of the vinyl will be cleaned up after matrix removal.

Other means for providing a matrix for a preshaped vinyl cover may be provided. The plaster matrix is cheap, of readily available materials, and can be provided with minimum preparation. Other materials, such as plastic foam having a rigid skeleton embedded therein may also be used, in which case the matrix may be reused.

What is claimed is:

1. In a process for applying a flexible plastic top sheet material to the outer surface of a metal real car body top, the steps which consist in preliminarily shaping sheet plastic roof material over a clean car body top mold, applying a matrix generating material to the outer surface of such preshaped plastic material to provide an assembly of a rigid support matrix and said preshaped plastic material, coating the cooperating available clean surfaces of the plastic portion of said assembly and the clean surface of a real car body top with adhesive material, applying said assembly to said real car body top so that the coated surfaces can contact each other for permanent union between the real car body top and the cemented surface of the plastic material and thereafter removing the matrix from said plastic material after said plastic material has been attached to said real car roof top.

2. The steps according to claim 1, wherein a protective coating is applied to what will finally be the outer surface of said plastic material prior to the application of matrix material thereover.

3. The method according to claim 1, wherein said matrix is generated by applying a plaster and gauze mixture to the outer surfaces of the plastic car roof material.

* * * * *